United States Patent
Chappell et al.

(10) Patent No.: US 12,330,600 B1
(45) Date of Patent: Jun. 17, 2025

(54) APPARATUS AND METHODS FOR DRYING A VEHICLE

(71) Applicant: Quick Quack Car Wash Holdings, LLC, Roseville, CA (US)

(72) Inventors: Christopher Clinton Chappell, Lincoln, CA (US); McNamara Marlow Pope, III, Fair Oaks, CA (US); Rodney Daniel Sparks, Antelope, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/637,237

(22) Filed: Apr. 16, 2024

(51) Int. Cl.
*B60S 3/00* (2006.01)
*F26B 15/12* (2006.01)
*F26B 21/00* (2006.01)

(52) U.S. Cl.
CPC .............. *B60S 3/002* (2013.01); *F26B 15/12* (2013.01); *F26B 21/004* (2013.01); *F26B 2210/12* (2013.01)

(58) Field of Classification Search
CPC .... F26B 15/12; F26B 21/004; F26B 2210/12; B60S 3/002
See application file for complete search history.

(56) References Cited

U.S. PATENT DOCUMENTS

| | | | | |
|---|---|---|---|---|
| 3,367,040 A | * | 2/1968 | Vani | B60S 3/002 |
| | | | | 34/571 |
| 3,742,615 A | * | 7/1973 | Capra | B60S 3/002 |
| | | | | 34/222 |
| 5,875,565 A | | 3/1999 | Bowman | |
| 6,123,503 A | * | 9/2000 | Belanger | F04D 29/441 |
| | | | | 415/212.1 |
| 2005/0235520 A1 | | 10/2005 | Dollhopf et al. | |
| 2019/0136860 A1 | * | 5/2019 | Ennis | F04D 27/003 |
| 2020/0079328 A1 | * | 3/2020 | Stephens, Jr. | F26B 3/04 |

FOREIGN PATENT DOCUMENTS

| | | | |
|---|---|---|---|
| CN | 210363743 U | * | 4/2020 |
| CN | 114312681 A | * | 4/2022 |
| WO | 03062028 A2 | | 7/2003 |

OTHER PUBLICATIONS

Translation, CN-210363743-U (Year: 2020).*
Translation, CN-114312681-A (Year: 2022).*

* cited by examiner

*Primary Examiner* — Jessica Yuen
(74) *Attorney, Agent, or Firm* — Caldwell Intellectual Property Law

(57) ABSTRACT

Described herein is an apparatus for drying a vehicle. An apparatus for drying a vehicle may include an overhead frame including two or more beams, a distal rod, a proximal rod, and at least a central rod. An apparatus for drying a vehicle may further include one or more sets of blowers, such as a first set of blowers mechanically attached to the two or more beams, a second set of blowers mechanically attached to the proximal rod, a third set of blowers mechanically attached to the distal rod, and a fourth set of blowers mechanically attached to a central rod.

20 Claims, 9 Drawing Sheets

APPARATUS AND METHODS FOR DRYING A VEHICLE

FIELD OF THE INVENTION

The present invention generally relates to the field of drying vehicles. In particular, the present invention is directed to systems and methods for drying a vehicle.

BACKGROUND

Current car wash systems for drying vehicles typically position blowers such that air is projected toward a vehicle predominantly in a V shape. This V shape creates velocity gaps where water may dance back and forth due to blowers blowing in differing directions. This may increase the amount of time and energy required for drying a vehicle, as water is not efficiently removed from the vehicle surface.

SUMMARY OF THE DISCLOSURE

In an aspect, a system for drying a vehicle may include an overhead frame, including at least two beams parallel to a longitudinal direction; a distal rod perpendicularly attached to the at least two beams; a proximal rod perpendicularly attached to the at least two beams, wherein the proximal rod is in the longitudinal direction of the distal rod; and at least a central rod attached to the at least two beams between the distal rod and the proximal rod; a first set of blowers mechanically attached to the at least two beams, wherein each blower of the first set of blowers comprises a nozzle attached to an outlet of each blower, configured to project air along a lateral side of a vehicle moving in the longitudinal direction; a second set of blowers mechanically attached to the proximal rod, wherein each blower of the second set of blowers is configured to project air downward; a third set of blowers mechanically attached to the distal rod, wherein each blower of the third set of blowers is configured to project air downward; and a fourth set of blowers mechanically attached to the at least a central rod, wherein each blower of the fourth set of blowers is configured to project air downward and in a first lateral direction.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for drying a vehicle. A system may include a plurality of blowers. In some embodiments, each set of blowers may have a consistent orientation. Blower positioning and orientation as described herein may improve efficiency of vehicle drying by reducing the extent to which blowers counteract each other, creating zero velocity zones.

Figure 1:
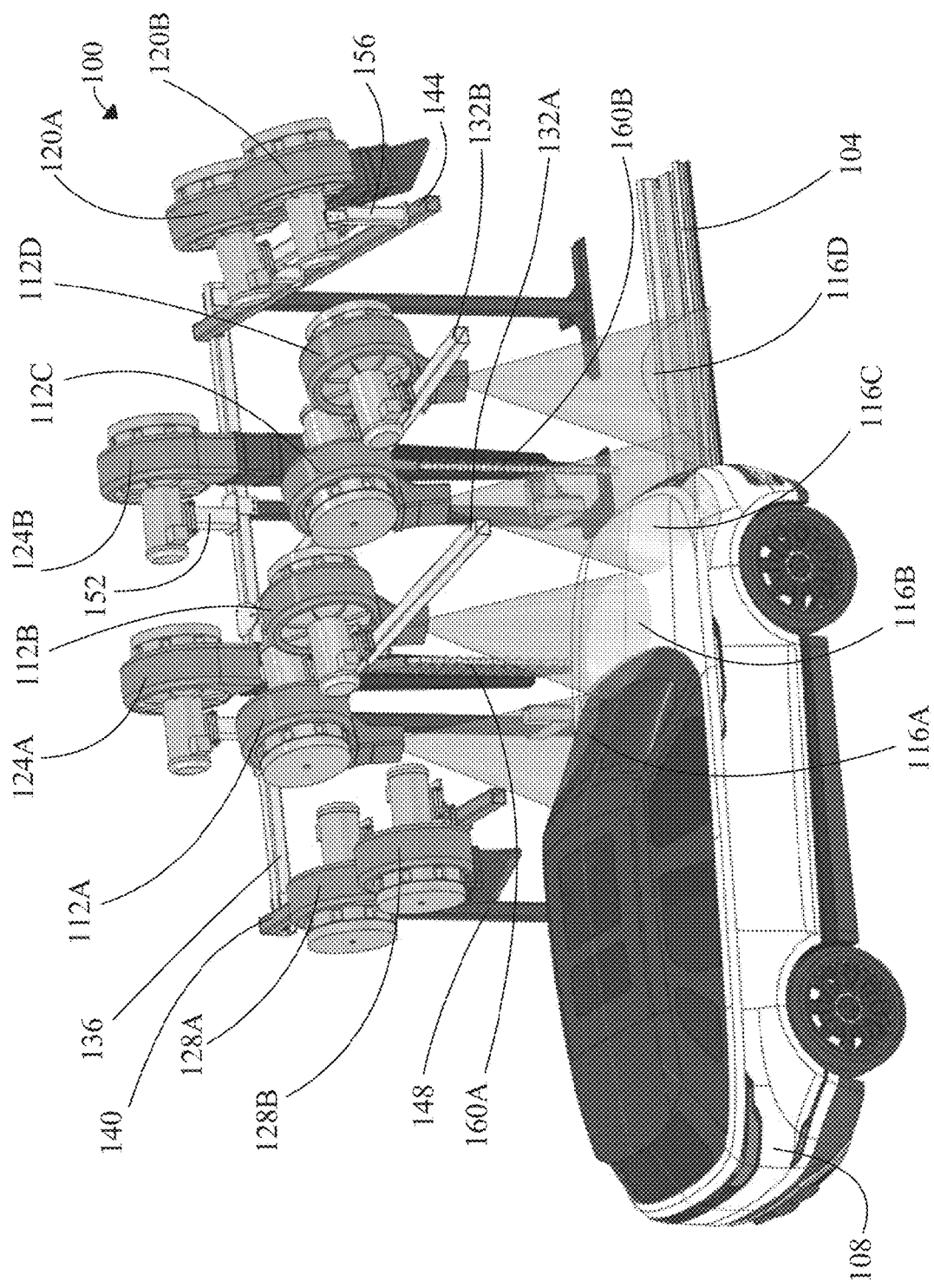
FIG. 1 is an illustration depicting a side and top view of an exemplary system for drying a vehicle.

Referring now to FIG. 1, an exemplary embodiment of an apparatus 100 for drying a vehicle is illustrated. Apparatus 100 may include a computing device. Apparatus 100 may include a processor. Processor may include, without limitation, any processor described in this disclosure. Processor may be included in computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

Still referring to FIG. 1, in some embodiments, apparatus 100 may include at least a processor and a memory communicatively connected to the at least a processor, the memory containing instructions configuring the at least a processor to perform one or more processes described herein. Computing device may include processor and/or memory. Computing device may be configured to perform one or more processes described herein.

Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may include a vehicle track 104. As used herein, a "vehicle track" is a path along which a vehicle may move. In some embodiments, movement may be provided by vehicle 108. In some embodiments, vehicle track 104 may include a device configured to move vehicle 108. For example, vehicle track 104 may include a conveyer belt. Vehicle track 104 may be configured such that vehicle 108 moves under and/or through apparatus 100 while moving on vehicle track 104. Vehicle track 104 may include a mechanism for keeping vehicle 108 on vehicle track 104. For example, vehicle track 104 may include a guard rail. Vehicle track 104 may include a mechanism for regulating how fast vehicle 108 travels while on vehicle track 104. For example, vehicle track 104 may include a conveyer belt which operates at a fixed speed. Vehicle track 104 may include a track in which a single tire or set of laterally aligned tires moves; such a track may hold left tires or right tires. A variety of vehicles may be compatible with apparatus 100, for example, depending on the scale at which apparatus 100 is constructed. Non-limiting examples of vehicles include cars, trucks, busses, motorcycles, boats, and aircraft.

Still referring to FIG. 1, in some embodiments, vehicle track 104 may be configured for vehicle movement in a first longitudinal direction. As used herein, a "longitudinal axis" with respect to a vehicle is an axis along which a vehicle moves. As used herein, a "lateral axis" with respect to a vehicle is an axis that is horizontal and perpendicular to a longitudinal axis. For example, if a vehicle moves forward through apparatus 100, then a longitudinal axis may be the direction in which the vehicle is moving. In another example, if a vehicle moves through apparatus 100 while parked on a conveyer belt, then a longitudinal axis may be the direction in which the conveyer belt moves, regardless of the direction in which the vehicle is facing.

Still referring to FIG. 1, in some embodiments, apparatus 100 may include a plurality of blowers. As used herein, a "blower" is a device configured to project air in a particular direction. A blower may include, for example, a fan. A plurality of blowers may include first blower 112A, second blower 112B, third blower 112C, fourth blower 112D, and/or additional blowers. A plurality of blowers may include 2, 3, 4, 5, 6, 7, 8, 9, 10, or more blowers. In some embodiments, a blower may be configured to project heated air. In some embodiments, projection of heated air may increase speed at which a vehicle is dried. A blower may project air from one or more nozzles. A blower may project air in a variety of shapes, for example based on nozzle shape and air speed. For example, a blower may project air in a pattern that approximates a cone or a cylinder. As used herein, a "blower target region" of a blower is a volume in which the blower projects air. First blower 112A may project air in first blower target region 116A. Second blower 112B may project air in second blower target region 116B. Third blower 112C may project air in third blower target region 116C. Fourth blower 112D may project air in fourth blower target region 116D. A blower may project air toward a vehicle surface region. As used herein, a "vehicle surface region" is an area of a surface of a vehicle. A vehicle surface region toward which air is projected may include an intersection of a blower target region and a surface of a vehicle. A vehicle surface region toward which air is projected may include a 3 dimensional surface, as the surface of the vehicle may be curved, for example. A center of a vehicle surface region may be the geometric center of an intersection of a blower target region and the surface of a vehicle. In some embodiments, blowers may project air such that there is no clear boundary between a region in which air is projected and regions toward which the blower does not project air. For example, projection of air or air speed may gradually fall off as one moves away from a focus of a blower.

Still referring to FIG. 1, in some embodiments, one or more blowers of plurality of blowers, such as first blower 112A, second blower 112B, third blower 112C, fourth blower 112D, and/or additional blowers, may project air downward and in a first lateral direction. Individual blowers of plurality of blowers may project air in the same direction or approximately the same direction. In some embodiments, the angle of air projection between two or more blowers of plurality of blowers may be within 5 degrees, 10 degrees, 15 degrees, 20 degrees, 25 degrees, 30 degrees, 35 degrees, 40 degrees, or 45 degrees. In some embodiments, the angle of air projection from downward is between 0 and 50 degrees. In some embodiments, the angle of air projection from downward is between 15 and 25 degrees. In some embodiments, the angle of air projection from downward is no less than 0 degrees, 1 degree, 5 degrees, 10 degrees, 15 degrees, or 20 degrees. In some embodiments, the angle of air projection from downward is no more than 50 degrees, 45 degrees, 40 degrees, 35 degrees, 30 degrees, 25 degrees, or 20 degrees. In some embodiments, all blowers of plurality of blowers may project air downward and in a first lateral direction. First lateral direction may be a direction on lateral axis. For example, first lateral direction may be left or right with respect to a direction of vehicle movement.

Still referring to FIG. 1, different blowers of plurality of blowers may be positioned at different positions along a longitudinal axis. For example, fourth blower 112D may be ahead of third blower 112C, which may be ahead of second blower 112B, which may be ahead of first blower 112A. Different blowers of plurality of blowers may be positioned at different positions along a lateral axis. In a non-limiting example, fourth blower 112D may be to the right of third blower 112C, which may be to the right of second blower 112B, which may be to the right of first blower 112A; in this case, plurality of blowers may project air downward and to the right. In another non-limiting example, blowers may be arranged such that fourth blower 112D may be to the left of third blower 112C, which may be to the left of second blower 112B, which may be to the left of first blower 112A; in this case, plurality of blowers may project air downward and to the left. One or more blowers of plurality of blowers may be positioned above vehicle 108.

Still referring to FIG. 1, in some embodiments, plurality of blowers may project air toward vehicle surface regions with differing positions. In a non-limiting example, first blower 112A is configured to project air toward a first vehicle surface region (intersection of vehicle 108 surface and first blower target region 116A) at an angle downward and in a first lateral direction, and second blower 112B may be configured to project air toward a second vehicle surface region (intersection of vehicle 108 surface and second blower target region 116B) at an angle downward and in the first lateral direction. In this example, the center of second vehicle surface region may be in the first longitudinal direction relative to the center of first vehicle surface region, and/or the center of second vehicle surface region may be in the first lateral direction relative to the center of first vehicle surface region. In this example, the center of third vehicle surface region (intersection of vehicle 108 surface and third blower target region 116C) may be in the first longitudinal direction and the first lateral direction relative to the center of second vehicle surface region. In this example, the center of fourth vehicle surface region (intersection of vehicle 108 surface and fourth blower target region 116D) may be in the first longitudinal direction and the first lateral direction relative to the center of third vehicle surface region. In this example, first longitudinal direction may be forward along a longitudinal axis, and first lateral direction may be in either direction along a lateral axis.

Still referring to FIG. 1, in some embodiments, a vehicle surface region may overlap with another vehicle surface region along a lateral and/or longitudinal axis. For example, first vehicle surface region may overlap with second vehicle surface region along both a lateral axis and a longitudinal axis. As described further with respect to FIG. 4, vehicle surface region overlap on one or both of these axes may aid in efficiently and consistently moving water off of vehicle 108.

Still referring to FIG. 1, in some embodiments, apparatus 100 may include one or more front blowers, such as first front blower 120A and second front blower 120B. Front blowers may be positioned above vehicle 108. In some embodiments, front blowers may project air predominantly downward. In some embodiments, front blowers may project air at an angle forward. Front blowers may be configured to project air toward a vehicle surface region on the front of vehicle 108.

Still referring to FIG. 1, in some embodiments, apparatus 100 may include one or more side blowers, such as first side blower 124A and second side blower 124B. A side blower may include a nozzle as described below. Side blowers may be positioned to a side of vehicle 108. In some embodiments, side blowers may project air downward and toward vehicle 108. In some embodiments, side blowers may project air at an angle backward. Side blowers may be configured to project air toward a vehicle surface region on the side of vehicle 108. Side blowers may be configured to project air toward a vehicle surface region on a lateral side of vehicle 108. As used herein, a "lateral side" of a vehicle is a region of a surface of the vehicle in which a line orthogonal to the surface would intersect a plane in the vertical and longitudinal directions at an angle of greater than 10 degrees.

Still referring to FIG. 1, in some embodiments, apparatus 100 may include one or more back blowers, such as first back blower 120A and second back blower 120B. In some embodiments, back blowers may project air predominantly downward. Back blowers may be configured to project air toward a vehicle surface region on the back of vehicle 108.

Figure 2:
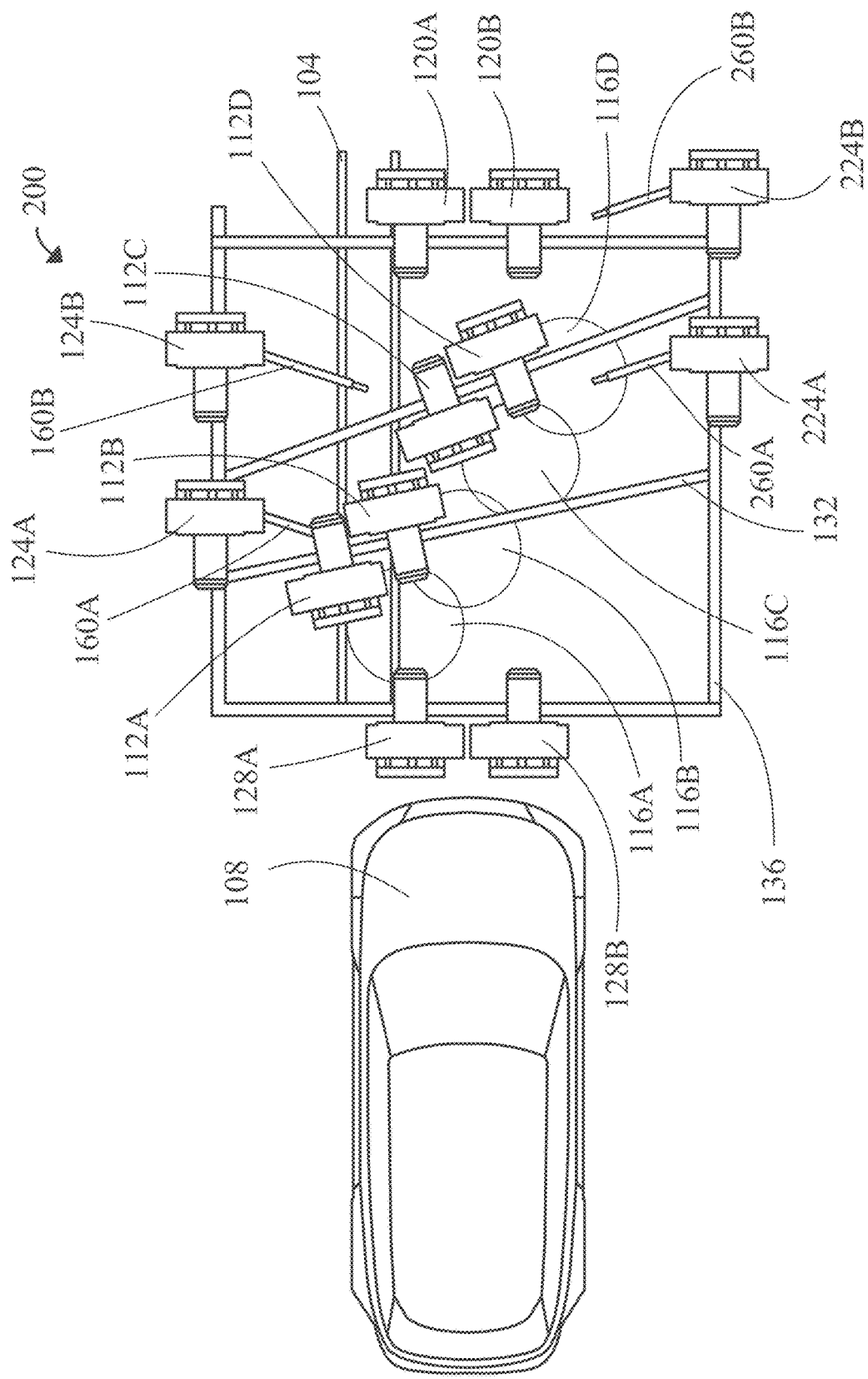
FIG. 2 is an illustration depicting a top view of an exemplary system for drying a vehicle.

Still referring to FIG. 1, in some embodiments, apparatus 100 may include central rod 132A, central rod 132B, beam 136, proximal rod 140, distal rod 144 and/or vertical structural element 148. As used herein, a "vertical structural element" is a component which provides structural support for a frame to maintain position above a vehicle track. Apparatus 100 may include one or more vertical structural elements 148, such as columns, positioned to the side of vehicle track 104. Vertical structural elements may be aligned on a lateral axis. Apparatus 100 may include a set of vertical structural elements 148 on either side of vehicle track 104. Vertical structural elements 148 may support beam 136. As used herein, a "beam" is a structural component which runs substantially in a horizontal and longitudinal direction. Beam 136 may be positioned above each set of aligned vertical structural elements. Beam 136 may support side blowers. For example, first side blower 124A may be affixed to beam 136 by a column such that first side blower 124A is positioned above the longitudinal horizontal structural element. Nozzle of first side blower 124A may extend below beam 136 and may include into a plurality of vertically aligned smaller openings or nozzles, configured to project air downward, backward along a longitudinal axis, and inward, toward vehicle 108, along a lateral axis. Additional side blowers may be positioned along beam 136 supporting first side blower 124A. An additional set of side blowers may be positioned along a second longitudinal horizontal structural element on the other side of vehicle track 104, as depicted in FIG. 2. Such additional set of side blowers may be positioned such that side blowers on a first side of vehicle track 104 are longitudinally offset from side blowers on a second side of vehicle track 104.

Still referring to FIG. 1, apparatus 100 may further include proximal rod 140, which runs along a lateral axis and supports first back blower 128A and/or second back blower 128B. As used herein, a "proximal rod" is a structural component which runs substantially in a horizontal and lateral direction and is positioned before a distal rod in a direction of vehicle movement. Back blowers may be in line with each other along a longitudinal axis. Back blowers may be positioned above proximal rod 140 and may include a nozzle extending downward. Apparatus 100 may further include distal rod 144, which runs along a lateral axis and supports first front blower 120A and/or second front blower 120B. As used herein, a "distal rod" is a structural component which runs substantially in a horizontal and lateral direction and is positioned after a proximal rod in a direction of vehicle movement. Front blowers may be in line with each other along a longitudinal axis. Front blowers may be positioned above distal rod 144 and may include a nozzle extending downward. In some embodiments, proximal rod 140 may be positioned at a first end of one or more beams such as beam 136. In some embodiments, distal rod 144 may be positioned at a second end of one or more beams such as beam 136. In some embodiments, distal rod 144 may be positioned in a longitudinal direction in comparison to proximal rod 140, such that vehicle 108 may pass under proximal rod 140 before passing under distal rod 144 as vehicle 108 moves through apparatus 100.

Still referring to FIG. 1, apparatus 100 may include one or more central rods 132A and/or 132B. As used herein, a "central rod" is a structural component connecting a first beam to a second beam. First central rod 132A may support first blower 112A, which may be positioned above first central rod 132A. Nozzle of first blower 112A may extend below first central rod 132A and may be behind first central rod 132A along a longitudinal axis. First central rod 132A may support second blower 112B, which may be positioned above first central rod 132A. Nozzle of second blower 112B may extend below first central rod 132A and may be in front of first central rod 132A along a longitudinal axis. Second central rod 132B may support third blower 112C, which may be positioned above second central rod 132B. Nozzle of third blower 112C may extend below second central rod 132B and may be behind second central rod 132B along a longitudinal axis. Second central rod 132B may support fourth blower 112D, which may be positioned above second central rod 132B. Nozzle of fourth blower 112D may extend below second central rod 132B and may be in front of second central rod 132B along a longitudinal axis. First and second central rods may be affixed to beam 136 on each side of vehicle track 104. First and second central rods may be horizontal, diagonal along lateral and longitudinal axes, and may be parallel or approximately parallel with each other. As used herein, two linear components are "approximately parallel" if they are within 15 degrees of being parallel. In some embodiments, first and second central rods may be within 1 degree, 5 degrees, 10 degrees, 15 degrees, 20 degrees, 25 degrees, 30 degrees, 35 degrees, or 45 degrees of parallel. In some embodiments, front blowers may be ahead of plurality of blowers, which may be ahead of back blowers, along a longitudinal axis.

Still referring to FIG. 1, in some embodiments, central rod 132A and/or 132B may include a structural support which may be used to maintain position of one or more blowers of plurality of blowers. In some embodiments, one or more blowers may be capable of movement. For example, blowers may pivot and/or translate. In some embodiments, blowers of plurality of blowers may translate along central rod 132. In some embodiments, side blowers may translate along beam 136. In some embodiments, back blowers may translate along proximal rod 140. In some embodiments, front blowers may translate along distal rod 144. In some embodiments, central rod 132 may translate along beam 136. For example, a central rod may translate along a longitudinal axis, while maintaining the same angle and/or relative position of attachment to beams on either side of vehicle track 104. In another example, a central rod may pivot. A central rod may extend and/or reduce in length in order to accommodate pivoting.

Still referring to FIG. 1, in some embodiments, a telescopic mechanism may be used to extend and/or reduce length of a central rod. This may be used to, for example, adjust length of a central rod such that central rod's length matches the length between beams to which the central rod is connected at the angle which central rod is at, as that angle changes. Such angle change may be due to, for example, central rod pivoting in order to reposition one or more blowers. Telescopic mechanism of central rod may include a plurality of segments which fit within each other. Such segments may slide in and out of each other without disconnecting, such that central rod's length is shortened or lengthened. In some embodiments, a telescopic mechanism of a central rod may include a guiding mechanism. For example, an inner surface of each telescopic segment may include one or more guide rails or grooves that align with complementary guide pins or rollers on the outer surface of an adjacent segment. Such guiding mechanism may enable segments to extend and retract linearly without misalignment. In some embodiments, a telescopic mechanism of a central rod may include a locking mechanism; once extended, segments may lock into place, such as using twist locks, button locks, or the like. In some embodiments, a telescopic mechanism may be manually operated. In some embodiments, a telescopic mechanism may be motor driven, such as using an actuator as described below.

Still referring to FIG. 1, in some embodiments, a central rod may move independently of side blowers and/or other central rods. In some embodiments, two or more central rods may move in unison. For example, two central rods may move such that they maintain their relative position throughout the movement. This may, for example, aid in avoiding collisions and maintaining blower target regions in a desired configuration, such as blowing in the same direction. In some embodiments, one or more side blowers may move based on movement of central rod. For example, a side blower may move such that central rod attachment to beam 136 may pass an original location of such side blower. Such side blower movement may be accomplished through translation along beam 136.

Still referring to FIG. 1, in some embodiments, blowers may move based on position of vehicle 108 and/or type of vehicle 108. In some embodiments, blowers may move such that they keep a constant distance to a vehicle surface region toward which they are projecting air. In another example, blowers may move such that they project air in a specific direction relative to vehicle 108 or other blowers. Blowers may move in order to adjust air speed at a vehicle surface region toward which the blower projects air. For example, air speed may fall off with distance from blower, so lower distances between blower and vehicle 108 may result in higher air speeds at vehicle surface region. Blowers may move in order to adjust the size of vehicle surface region toward which blower projects air. In some embodiments, a blower may project air in approximately a conical pattern, such that the size of a region toward which the blower projects air increases with distance from the blower.

Still referring to FIG. 1, in some embodiments, a structural component may separate one or more blowers from an element of a frame to which they are attached. For example, side blowers may be separated from beam 136 by spacer 152. In another example, front blowers may be separated from distal rod 144 by spacer 156. A spacer may provide vertical distance between a frame and a blower. In some embodiments, a single blower may be attached to a spacer. In some embodiments, a plurality of blowers may be attached to a spacer. In some embodiments, a spacer may translate along an element of a frame to which it is attached. In some embodiments, bearings and/or slides may be used to reduce friction and/or wear between translating elements.

Still referring to FIG. 1, in some embodiments, blower and/or spacer translation may be accomplished using a linear actuator mechanism. An actuator may include a component of a machine that is responsible for moving and/or controlling a mechanism or system. An actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator responds by converting source power into mechanical motion. In some cases, an actuator may be understood as a form of automation or automatic control.

Still referring to FIG. 1, in some embodiments, actuator may include a hydraulic actuator. A hydraulic actuator may consist of a cylinder or fluid motor that uses hydraulic power to facilitate mechanical operation. Output of hydraulic actuator may include mechanical motion, such as without limitation linear, rotatory, or oscillatory motion. In some cases, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator may include a pneumatic actuator. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator may include an electric actuator. Electric actuator may include electromechanical actuators, linear motors, and the like. In some cases, actuator may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some embodiments, side blower 124A may include first nozzle 160A. Side blower 124B may include second nozzle 160B. Nozzles may be affixed to an outlet of a corresponding side blower. Nozzles may include one or more outlets. Nozzle outlets may be aligned vertically as shown in FIG. 1. A side blower may include a plurality of nozzle outlets. A side blower may include, for example, 1, 2, 3, 4, 5, 6, 7, 8, 9, 10, 11, 12, 13, 14, 15, 16, 17, 18, 19, 20, 21, 22, 23, 24, 25, or more nozzle outlets. Nozzle outlets may be constructed from a material which does not damage nozzle outlets or vehicle 108 if they come into contact. In some embodiments, nozzle outlets may be constructed from rubber. In some embodiments, a side blower nozzle may include a tube structure extending from the associated side blower to the bottom of the side blower nozzle. Such tube structure may connect side blower nozzle outlets. Such tube structure may taper in one or more horizontal dimensions from top to bottom of such tube structure. In some embodiments, one or more side nozzle outlets may taper in width from a point at which side nozzle outlet attaches to side nozzle tube structure to a point at which air escapes from side nozzle outlet, such as an end of side nozzle outlet.

Still referring to FIG. 1, in some embodiments, side blowers 124A and/or 124B and/or side blower nozzles 160A and/or 160B may pivot and/or translate. This may be used to, for example, move side blower nozzles up or down. For example, spacer 152 may extend and/or contract using a telescopic mechanism. This may have the effect of moving attached side blower nozzles up or down. In another example, a side blower nozzle may itself expand or contract in a region at the top of side blower nozzle tube structure as described above, above side blower nozzle outlets. This may have the effect of moving side blower nozzle outlets up or down. In some embodiments, a side blower nozzle may pivot. For example, a side blower may include a component which rotates side blower nozzle. Side blower nozzles may also move in a longitudinal direction along with their side blowers, in a context where side blowers translate along beam 136 as described herein.

Still referring to FIG. 1, in some embodiments, apparatus 100 may include one or more cameras which may be used to detect vehicle 108 and/or one or more attributes of vehicle 108. Cameras may capture images of vehicle 108 as vehicle 108 moves through apparatus 100. Apparatus 100 may include a computing device configured to process image data, such as images captured by cameras and use optical character recognition (OCR) and/or machine vision to detect attributes of vehicle 108. Attributes which may be detected include, in non-limiting examples, make and model of vehicle 108, and dimensions of vehicle 108. Such data may be used to, for example, adjust positioning and/or orientation of one or more blowers such that blowers may project air at optimal angles and distances from vehicle 108 such that water is efficiently removed. For example, OCR may be used to read license plate information, and/or identifying characters on vehicle 108 such as brand names, in order to identify vehicle 108. Identification of vehicle 108 may be used to determine a 3D model of vehicle 108, which may be used to position and/or orient blowers. In another example, machine vision may be used to determine locations of one or more surfaces of vehicle 108, and/or determine a 3D model of vehicle 108, which may similarly be used to position and/or orient blowers. For example, it may be desirable to maintain a constant distance between a blower and a vehicle surface, in order to maintain high air speeds at the vehicle while avoiding contacting the vehicle with the blower. Blowers may be moved to a farther away position if a large vehicle is detected. Blowers may be moved to a closer position if a small vehicle is detected. In some embodiments, blowers may be moved between drying different vehicles. In some embodiments, blowers may be moved during a vehicle drying process. Moving blowers may include user of linear actuator and/or telescopic designs as described herein.

Still referring to FIG. 1, in some embodiments, apparatus 100 may determine a blower position datum. As used herein, a "blower position datum" is a datum describing a position, orientation, or both, of a blower. In some embodiments, apparatus 100 may determine a blower position datum using a blower position machine learning model.

Still referring to FIG. 1, blower position machine learning model may be trained using a supervised learning algorithm. Blower position machine learning model may be trained on a training dataset including example vehicle profiles, associated with example blower position data. Such a training dataset may be obtained by, for example, gathering data on blower positions and/or orientations manually set in order to accommodate varying vehicle profiles. Once blower position machine learning model is trained, it may be used to determine a blower position datum. Apparatus 100 may input a vehicle profile into blower position machine learning model, and apparatus 100 may receive a blower position datum from the model.

Still referring to FIG. 1, in some embodiments, blower position machine learning model may be trained using a reinforcement learning algorithm. For example, blower position machine learning model may be given inputs such as vehicle profiles, and blower position machine learning model may be adjusted based on a cost function, where the cost function is based on the model's output. Such a cost function may take into account, for example, user feedback, a degree of dryness of vehicle after going through apparatus 100, a distance between a blower and vehicle 108, and/or manual assessment of vehicle profiles by humans.

Still referring to FIG. 1, in some embodiments, blower position machine learning model may also output one or more operational parameters of blowers, such as airflow rate, air velocity, static pressure, horsepower, fan speed, temperature, and the like. Such operational parameters may be included as example outputs in a training data set, such that blower position machine learning model is trained to produce such outputs.

Still referring to FIG. 1, in some embodiments, apparatus 100 may adjust a position and/or orientation of a blower as a function of a blower position datum. For example, a blower position datum may indicate a position of a blower of plurality of blowers, and apparatus 100 may pivot a central rod supporting the blower, translate the central rod along beams supporting the central rod, translate the blower along the central rod, and/or pivot the blower such that the blower is in the indicated position.

Still referring to FIG. 1, in some embodiments, apparatus 100 may adjust positioning and/or orientation of one or more blowers as a cohesive unit. For example, side blowers 124A and 124B and central rods 132A and 132B may be translated along beam 136 at a consistent velocity. This may be done, as examples, such that blowers may follow vehicle 108 as vehicle 108 moves through apparatus 100, or such that blowers may reset after vehicle 108 leaves apparatus 100. In another example, apparatus 100 may detect a vehicle size using a machine vision system as described above and may simultaneously adjust blowers in order to make space for vehicle 108. For example, orientation of multiple side blower nozzles may be adjusted in order to avoid collision with vehicle 108. In some embodiments, apparatus 100 may include one or more pre-programmed movement sets in order to achieve such goals. For example, a first movement set may reset apparatus 100 to a default position. Another movement set may position blowers in preparation for a vehicle of a particular size. Another movement set may include movement and/or activation of blowers as vehicle 108 travels through apparatus 100. In some embodiments, movement of blowers may be automatic. In some embodiments, movement of blowers may be based on input by a user.

Still referring to FIG. 1, one or more features of a system or method described herein may be consistent with any feature disclosed in U.S. patent application Ser. No. 18/195,760, filed on May 10, 2023, and titled "APPARATUS AND METHOD OF VEHICLE PROFILING," and/or U.S. patent application Ser. No. 18/196,517, filed on May 12, 2023, and titled "METHODS AND APPARATUSES FOR SELF-ADJUSTING CAR WASH EQUIPMENT WITHIN A CAR WASH TUNNEL," the entirety of each of which is hereby incorporated by reference.

Referring now to FIG. 2, a top-down view of apparatus 200 is provided. Apparatus 200 may include vehicle track 104, vehicle 108, first blower 112A, second blower 112B, third blower 112C, fourth blower 112D, first blower target region 116A, second blower target region 116B, third blower target region 116C, fourth blower target region 116D, first front blower 120A, second front blower 120B, first side blower 124A, first side blower nozzle 160A, second side blower 124B, second side blower nozzle 160B, first back blower 128A, second back blower 128B, first central rod 132A, second central rod 132B, beam 136, proximal rod 140, distal rod 144, vertical structural element 148, spacer 152, and/or spacer 156, each of which is described above with reference to FIG. 1. Apparatus 200 may also include third side blower 224A, third side blower nozzle 260A, fourth side blower 224B, and fourth side blower nozzle 260B, which may include additional side blowers as described above with reference to FIG. 1. Third and fourth side blowers may be positioned on longitudinal horizontal structural element opposite longitudinal horizontal structural element supporting first side blower 124A and second side blower 124B.

Figure 3:
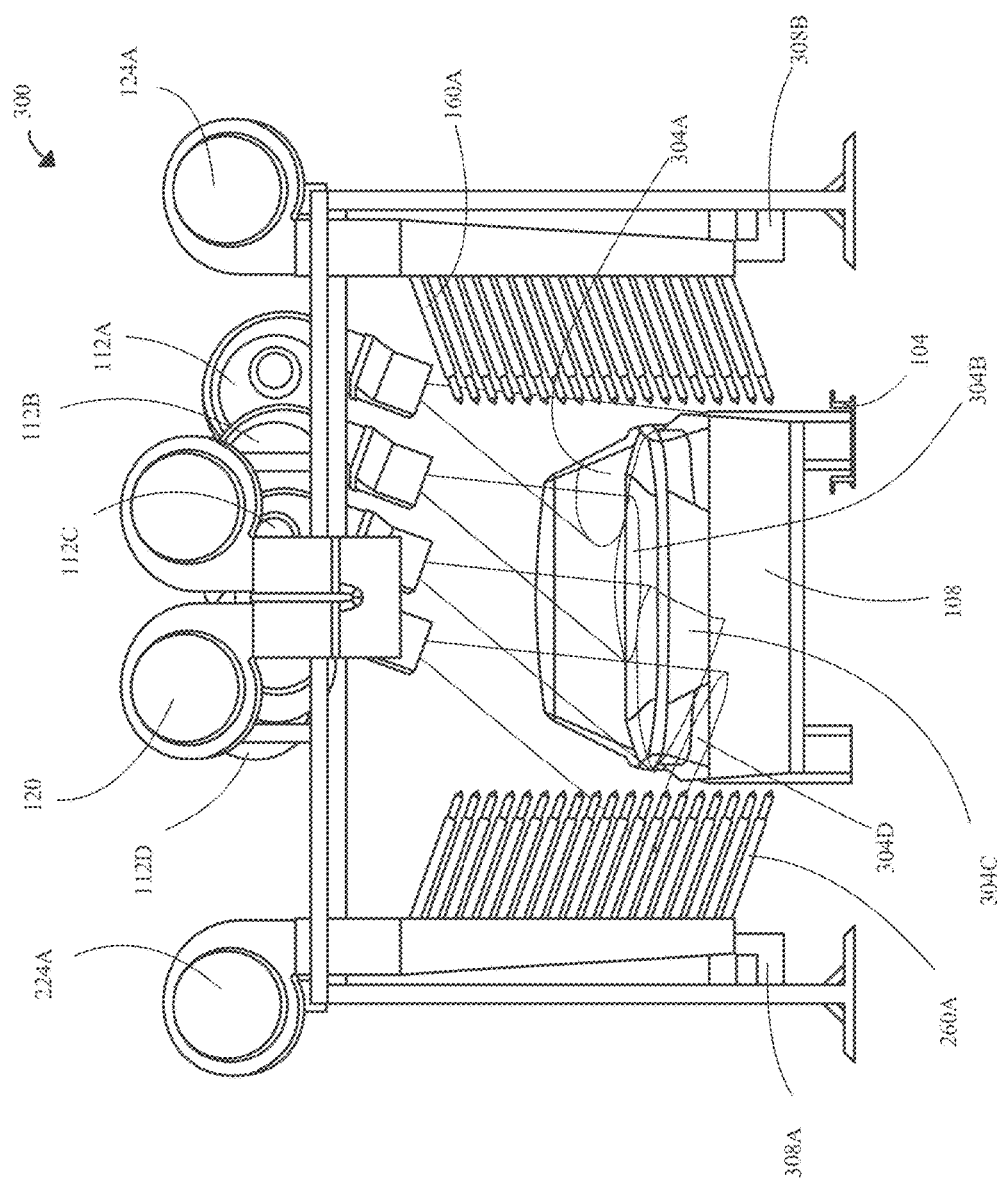
FIG. 3 is an illustration depicting a front view of an exemplary system for drying a vehicle.

Referring now to FIG. 3, a front view of apparatus 300 is provided. Apparatus 300 may include vehicle track 104, vehicle 108, first blower 112A, second blower 112B, third blower 112C, fourth blower 112D, first blower target region 116A, second blower target region 116B, third blower target region 116C, fourth blower target region 116D, first front blower 120A, second front blower 120B, first side blower 124A, first side blower nozzle 160A, second side blower 124B, second side blower nozzle 160B, first back blower 128A, second back blower 128B, first central rod 132A, second central rod 132B, beam 136, proximal rod 140, distal rod 144, vertical structural element 148, spacer 152, and/or spacer 156, each of which is described above with reference to FIG. 1, as well as third side blower 224A, third side blower nozzle 260A, fourth side blower 224B, and/or fourth side blower nozzle 260B, each of which is described above with reference to FIG. 2. Some elements, such as back blowers, may be visually obscured from the perspective of FIG. 3. First vehicle surface region 304A may include an intersection between first blower target region 116A and vehicle 108. Second vehicle surface region 304B may include an intersection between second blower target region 116B and vehicle 108. Third vehicle surface region 304C may include an intersection between third blower target region 116C and vehicle 108. Fourth vehicle surface region 304D may include an intersection between fourth blower target region 116D and vehicle 108.

Still referring to FIG. 3, in some embodiments, apparatus 300 may include nozzle securing component 308A and/or 308B. A nozzle securing component may include a component which stabilizes a side nozzle, such as by preventing side to side motion. In some embodiments, a nozzle securing component may include a rigid structure which attaches a side nozzle to a vertical structural element. A nozzle securing component may include, in a non-limiting example, a clamp.

Figure 4:
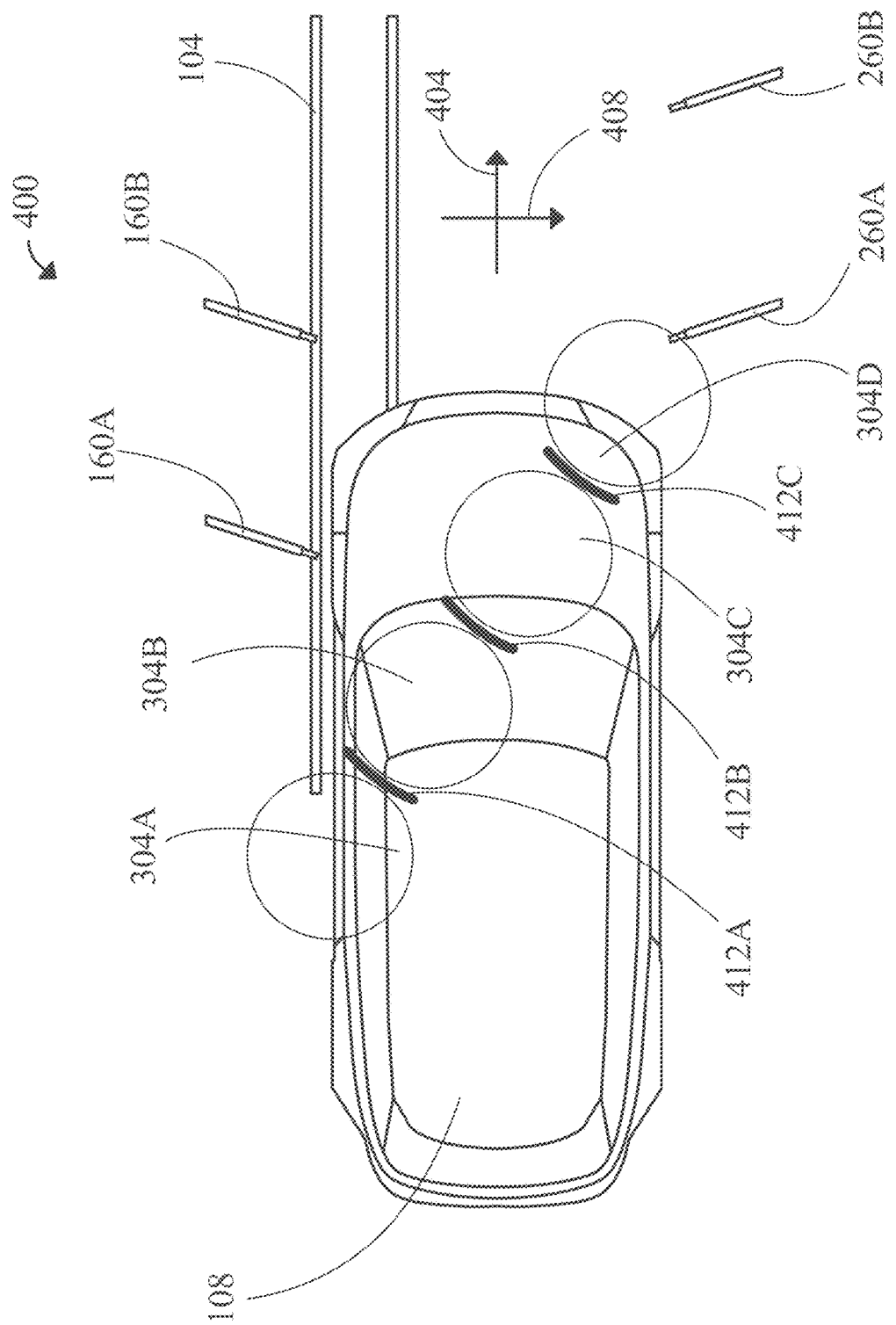
FIG. 4 is an illustration depicting a top view of an exemplary system for drying a vehicle.

Referring now to FIG. 4, a top-down view of apparatus 400 is provided. Apparatus 400 may include vehicle track 104, vehicle 108, first blower 112A, second blower 112B, third blower 112C, fourth blower 112D, first blower target region 116A, second blower target region 116B, third blower target region 116C, fourth blower target region 116D, first front blower 120A, second front blower 120B, first side blower 124A, first side blower nozzle 160A, second side blower 124B, second side blower nozzle 160B, first back blower 128A, second back blower 128B, first central rod 132A, second central rod 132B, beam 136, proximal rod 140, distal rod 144, vertical structural element 148, spacer 152, and/or spacer 156, each of which is described above with reference to FIG. 1, as well as third side blower 224A, third side blower nozzle 260A, fourth side blower 224B, and/or fourth side blower nozzle 260B, each of which is described above with reference to FIG. 2, as well as first vehicle surface region 304A, second vehicle surface region 304B, third vehicle surface region 304C, and fourth vehicle surface region 304D, each of which is described above with reference to FIG. 3. First longitudinal direction 404 is depicted by an arrow as indicated in FIG. 4. First longitudinal direction 404 may align with longitudinal axis. Vehicle 108 may move through apparatus 400 in the direction of first longitudinal direction. Front blowers may project air downward and in first longitudinal direction 404. Side blowers may project air laterally toward vehicle 108 and/or vehicle track 104, downward, and backward (away from first longitudinal direction 404). First lateral direction 408 is depicted by an arrow as indicated in FIG. 4. In some embodiments, plurality of blowers including first blower 112A, second blower 112B, third blower 112C, fourth blower 112D, and/or additional blowers may project air downward and in first lateral direction. In some embodiments, plurality of blowers including first blower 112A, second blower 112B, third blower 112C, fourth blower 112D, and/or additional blowers may project air downward and away from first lateral direction.

Still referring to FIG. 4, in some embodiments, a zero-air velocity zone is created between vehicle surface regions. For example, zero air velocity zone 412A, 412B, and/or 412C may be created. As used herein, a "zero air velocity zone" is a region where air is projected in opposing directions by multiple blowers. In some embodiments, zero air velocity zones may lead to inefficiency, as blowers may fail to move water off vehicle 108 in these areas. Configurations of blowers as described herein may aid in reducing zero velocity zones, as sets of blowers, such as front blowers, back blowers, plurality of blowers, and blowers on each side, individually project air in the same direction. This may reduce instances of opposing blowers blowing water in opposite directions, potentially resulting in water dancing back and forth rather than efficiently being removed from vehicle 108 surface. Additionally, diagonal pattern of vehicle surface regions created by plurality of blowers may remove water from sections of vehicle surface before that section of vehicle surface enters a zero-velocity zone due to vehicle 108 travelling through a system described herein. For example, as vehicle 108 progresses in first longitudinal direction 404, water on left side of top surface of vehicle 108 may be pushed in first lateral direction by first blower 112A projecting air toward first vehicle surface region 304A. As vehicle 108 continues progressing in first longitudinal direction 404, water on center of top surface of vehicle 108 may be pushed in first lateral direction by second blower 112B projecting air toward second vehicle surface region 304B. As vehicle 108 continues progressing in first longitudinal direction 404, water on right of top surface of vehicle 108 may be pushed in first lateral direction by third blower 112C projecting air toward third vehicle surface region 304C. As vehicle 108 continues progressing in first longitudinal direction 404, water on right edge of top surface of vehicle 108 may be pushed in first lateral direction by third blower 112C projecting air toward fourth blower target region 116D, once fourth blower target region 116D intersects with vehicle 108 surface. This may efficiently move water in first lateral direction and off of vehicle 108.

Figure 5:
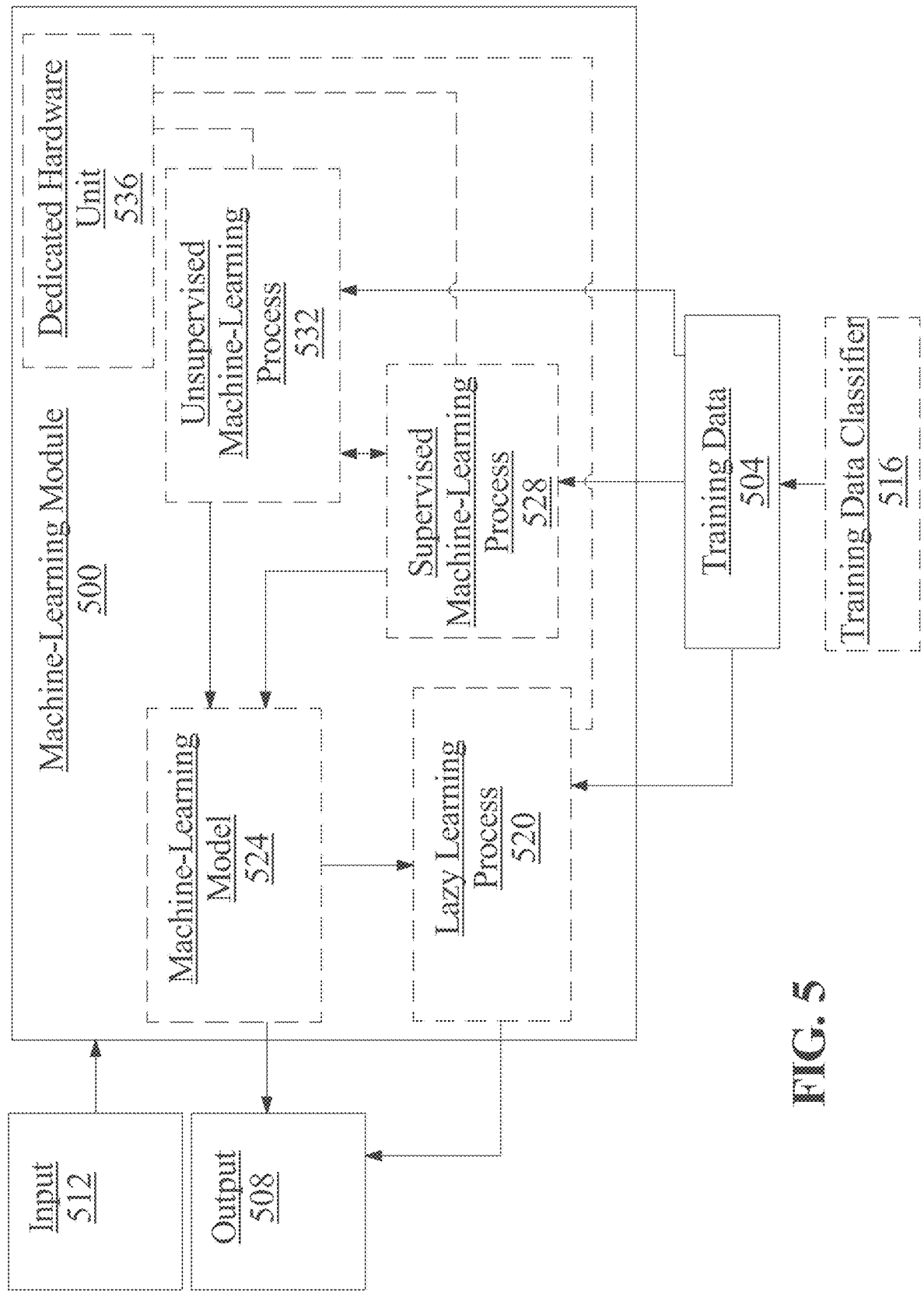
FIG. 5 is a box diagram of an exemplary machine learning model.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, inputs may include image data and outputs may include text.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to individual letters, numbers or other characters.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include image data as described above as inputs, text as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
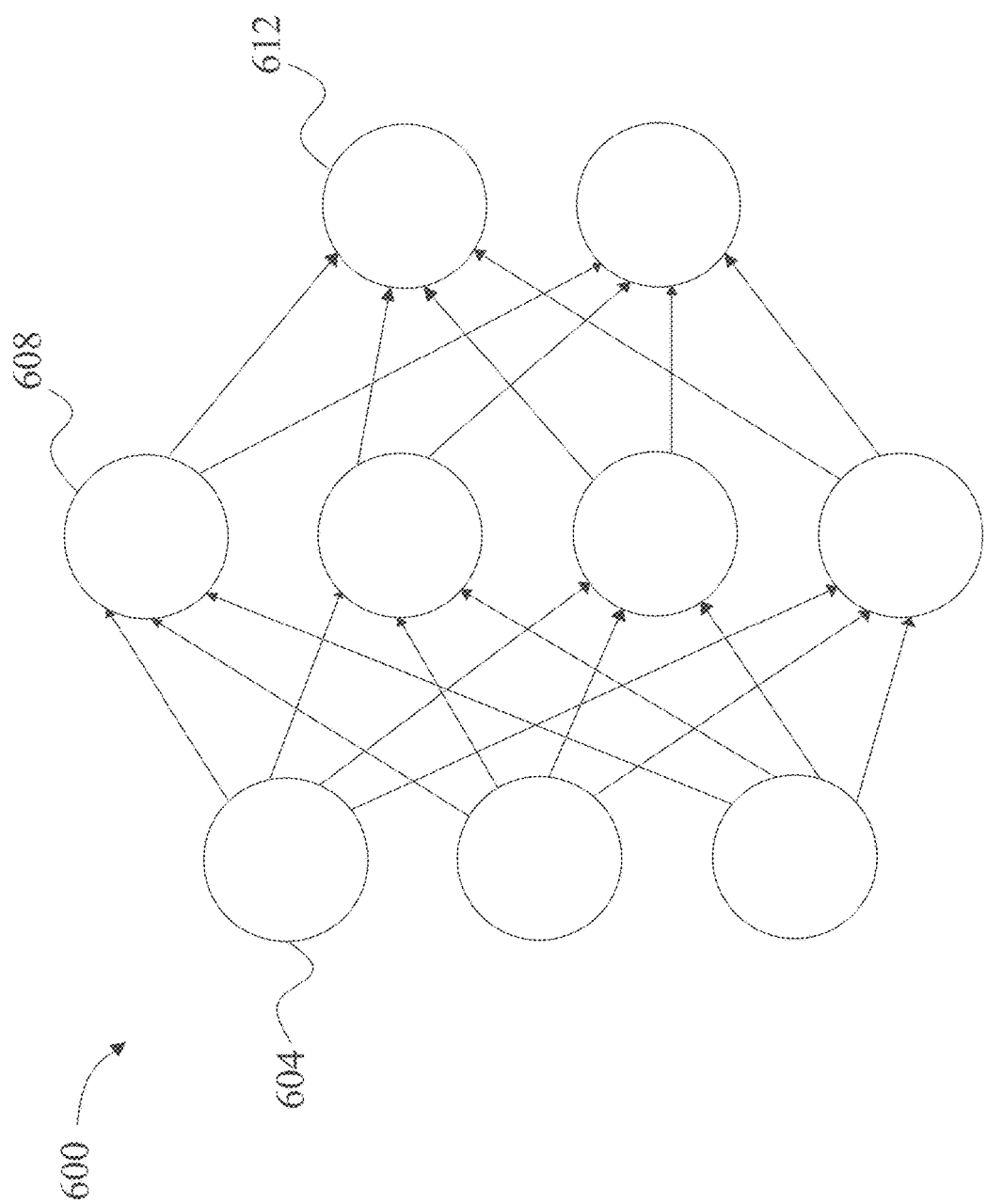
FIG. 6 is a diagram of an exemplary neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
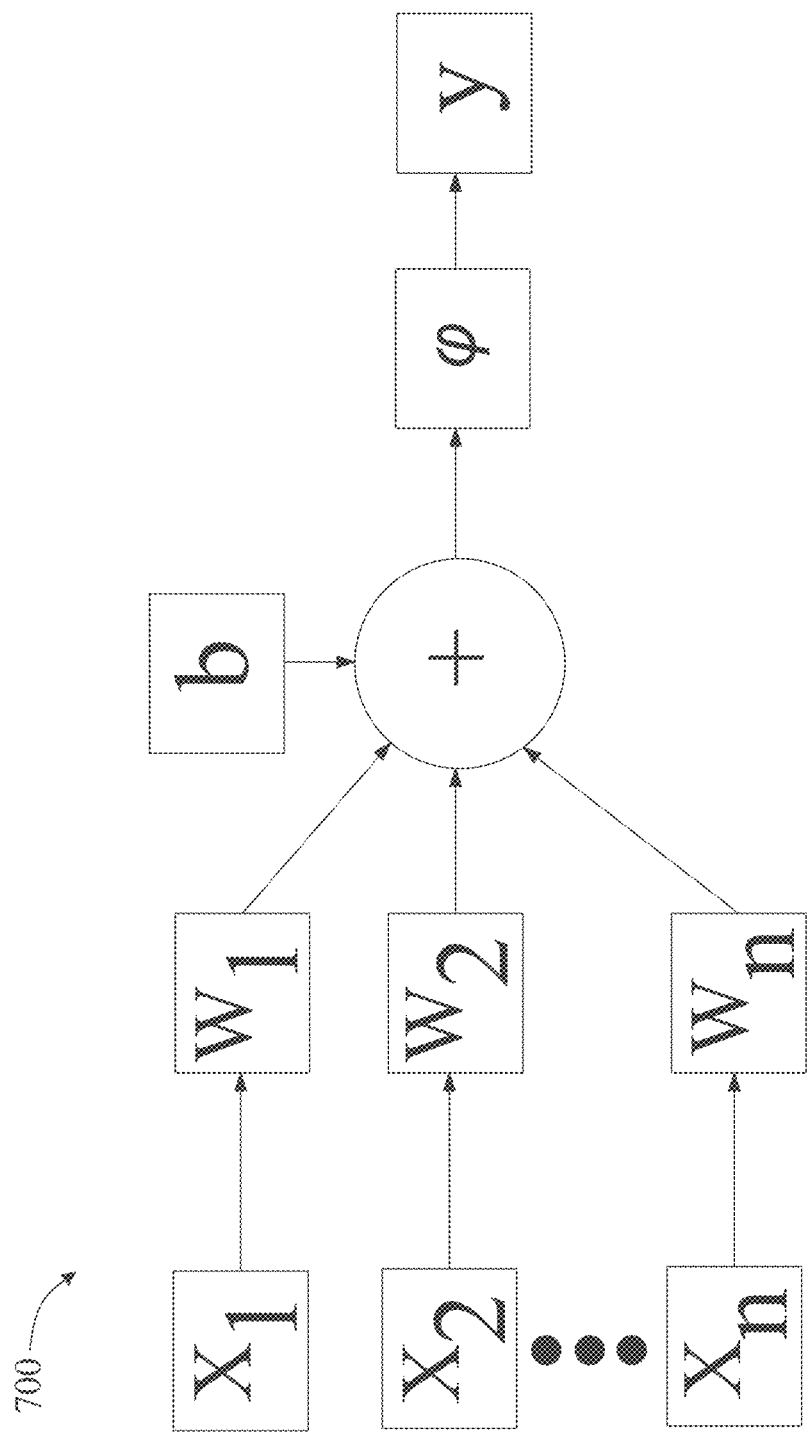
FIG. 7 is a diagram of an exemplary neural network node.

Referring now to FIG. 7, an exemplary embodiment of a node 700 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x) = \tanh^2(x)$, a rectified linear unit function such as $f(x) = \max(0,x)$, a "leaky" and/or "parametric" rectified linear unit function such as $f(x) = \max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x^*\text{sigmoid}(x)$, a Gaussian error linear unit function such as $f(x) = \alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 7, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 7, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 8:
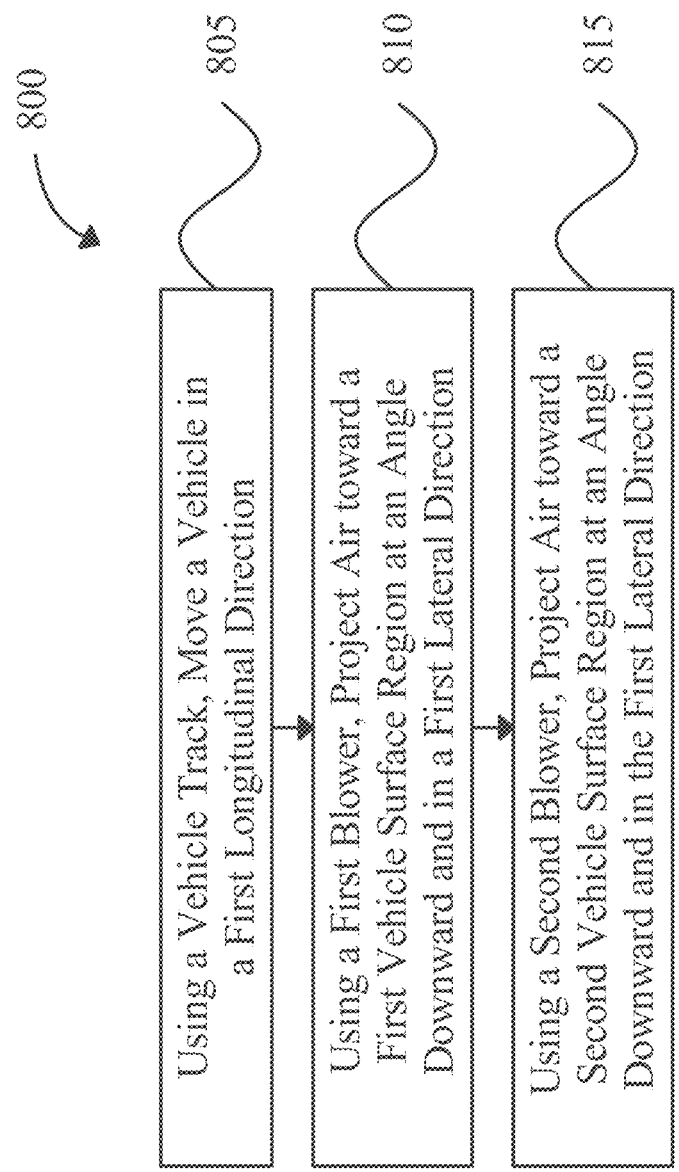
FIG. 8 is a diagram depicting an exemplary method of drying a vehicle.

Referring now to FIG. 8, an exemplary embodiment of a method 800 of drying a vehicle is illustrated. One or more steps if method 800 may be implemented, without limitation, as described with reference to other figures. One or more steps of method 800 may be implemented, without limitation, using at least a processor.

Still referring to FIG. 8, in some embodiments, method 800 may include, using a vehicle track, moving a vehicle in a first longitudinal direction 805.

Still referring to FIG. 8, in some embodiments, method 800 may include using a first blower, projecting air toward a first vehicle surface region at an angle downward and in a first lateral direction 810.

Still referring to FIG. 8, in some embodiments, method 800 may include using a second blower, projecting air toward a second vehicle surface region at an angle downward and in the first lateral direction 815.

Still referring to FIG. 8, in some embodiments, the center of the second vehicle surface region is in the first longitudinal direction relative to the center of the first vehicle surface region. In some embodiments, the center of the second vehicle surface region is in the first lateral direction relative to the center of the first vehicle surface region. In some embodiments, the second vehicle surface region overlaps the first vehicle surface region along a lateral axis. In some embodiments, the angle of the first blower from vertical is 0-50 degrees. In some embodiments, the angle of the second blower from vertical is 0-50 degrees. In some embodiments, the angle of the first blower from vertical is 15-25 degrees. In some embodiments, the angle of the second blower from vertical is 15-25 degrees. In some embodiments, wherein the angle of the first blower is within 30 degrees of the angle of the second blower. In some embodiments, all blowers used to project air toward the vehicle are configured to project air downward and in the first lateral direction. In some embodiments, the second vehicle surface region overlaps the first vehicle surface region along a longitudinal axis of the vehicle. In some embodiments, the first blower and the second blower are each configured to move according to a position of the vehicle.

Still referring to FIG. 8, in some embodiments, method 800 may further include using a front blower to project air toward a front vehicle surface region. In some embodiments, method 800 may further include using a side blower to project air toward a side vehicle surface region. In some embodiments, method 800 may further include using a back blower to project air toward a back vehicle surface region.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
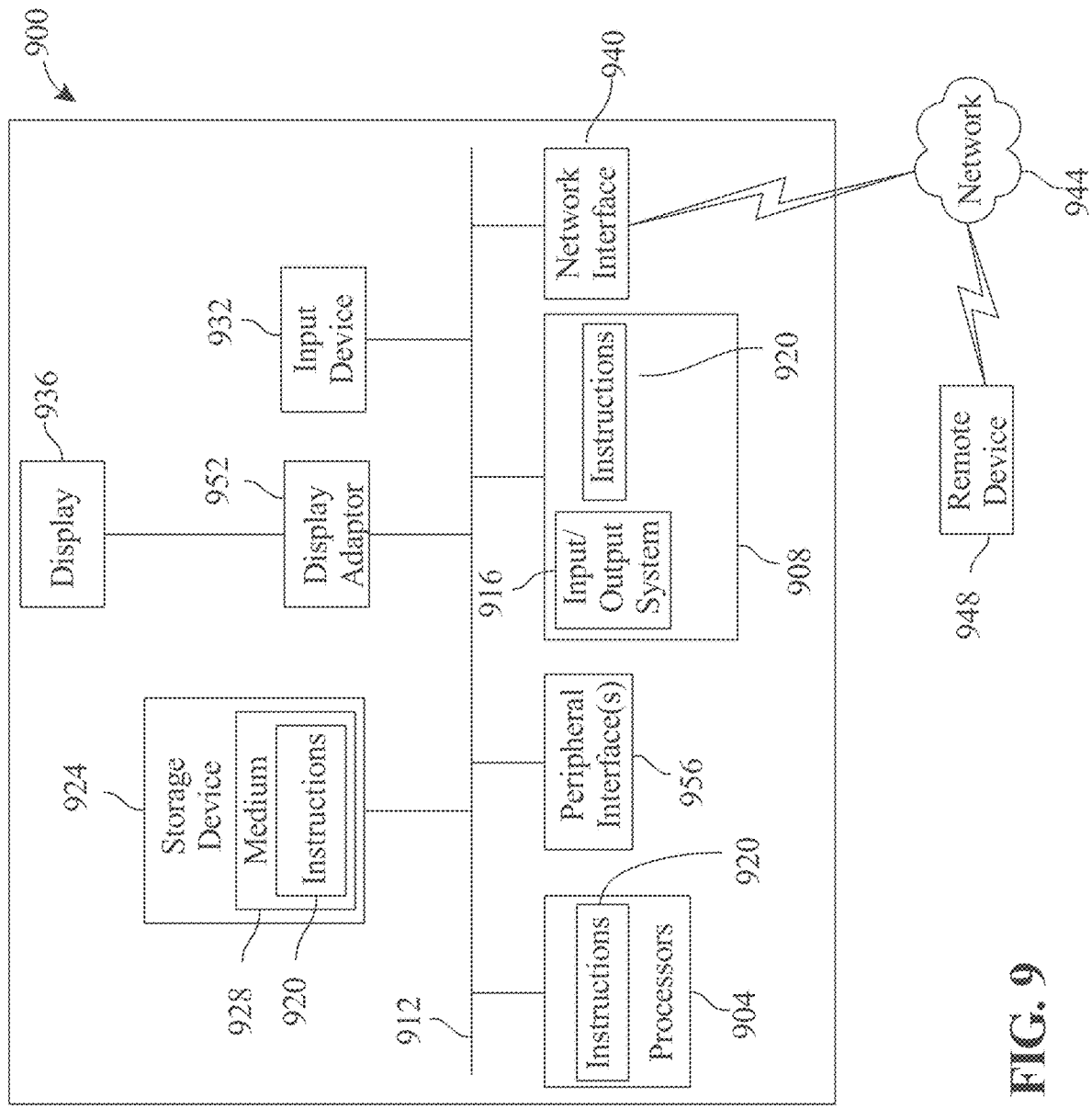
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for drying a vehicle, the apparatus comprising:
 an overhead frame, wherein the overhead frame comprises:
  at least two beams parallel to a longitudinal direction;
  a distal rod perpendicularly attached to the at least two beams;
  a proximal rod perpendicularly attached to the at least two beams, wherein the proximal rod is in the longitudinal direction of the distal rod; and
  at least a central rod attached to the at least two beams between the distal rod and the proximal rod;
 a first set of blowers mechanically attached to the at least two beams, wherein each blower of the first set of blowers comprises a nozzle attached to an outlet of each blower, configured to project air along a lateral side of a vehicle moving in the longitudinal direction;
 a second set of blowers mechanically attached to the proximal rod, wherein each blower of the second set of blowers is configured to project air downward;
 a third set of blowers mechanically attached to the distal rod, wherein each blower of the third set of blowers is configured to project air downward; and
 a fourth set of blowers mechanically attached to the at least a central rod, wherein each blower of the fourth set of blowers is configured to project air downward and in a first lateral direction.

2. The apparatus of claim 1, wherein the distal rod is attached to distal ends of the at least two beams, wherein the proximal rod is attached to proximal ends of the at least two beams.

3. The apparatus of claim 1, wherein the at least a central rod comprises a plurality of central rods.

4. The apparatus of claim 3, wherein the plurality of central rods are parallel.

5. The apparatus of claim 1, wherein the at least a central rod is configured to translate in the longitudinal direction.

6. The apparatus of claim 1, wherein the at least a central rod is configured to pivot on a point at which the at least a central rod is attached to a beam of the at least two beams.

7. The apparatus of claim 1, wherein the at least a central rod is configured to change its length using a telescopic mechanism.

8. The apparatus of claim 1, wherein each blower of the first set of blowers is configured to translate along a beam of the at least two beams.

9. The apparatus of claim 1, wherein each blower of the fourth set of blowers is configured to project air downward and in the first longitudinal direction.

10. The apparatus of claim 1, wherein blowers of the fourth set of blowers are spaced a pre-determined distance apart and positioned diagonally relative to one another to eliminate air velocity gaps on a surface of the vehicle.

11. The apparatus of claim 1, wherein each blower of the fourth set of blowers has an angle from vertical of 0-50 degrees.

12. The apparatus of claim 1, wherein each blower of the fourth set of blowers has an angle from vertical of 15-25 degrees.

13. The apparatus of claim 1, further comprising a vehicle track configured for vehicle movement in the longitudinal direction.

14. The apparatus of claim 13, wherein the vehicle track comprises a conveyer belt.

15. The apparatus of claim 1, wherein the fourth set of blowers comprises:

a first blower and a second blower, wherein:

the first blower is configured to project air toward a first vehicle surface region;

the second blower is configured to project air toward a second vehicle surface region;

the center of the second vehicle surface region is in the longitudinal direction relative to the center of the first vehicle surface region;

the center of the second vehicle surface region is in the first lateral direction relative to the center of the first vehicle surface region; and the second vehicle surface region overlaps the first vehicle surface region along a lateral axis.

16. The apparatus of claim 15, wherein the angle of the first blower is within 30 degrees of the angle of the second blower.

17. The apparatus of claim 15, wherein the second vehicle surface region overlaps the first vehicle surface region along a longitudinal axis of the vehicle.

18. The apparatus of claim 15, wherein the first blower and the second blower are each configured to move according to a position of the vehicle.

19. The apparatus of claim 15, wherein the first blower and the second blower are mechanically attached to the same central rod.

20. The apparatus of claim 15, wherein the first blower is configured to translate along the central rod.

* * * * *